(12) United States Patent
Inoue et al.

(10) Patent No.: US 10,897,603 B2
(45) Date of Patent: Jan. 19, 2021

(54) PROJECTION DISPLAY DEVICE FOR PROJECTING AND IMAGING

(71) Applicant: FUJIFILM Corporation, Tokyo (JP)

(72) Inventors: Kazuki Inoue, Saitama (JP); Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/511,008

(22) Filed: Jul. 15, 2019

(65) Prior Publication Data

US 2020/0033712 A1 Jan. 30, 2020

(30) Foreign Application Priority Data

Jul. 27, 2018 (JP) .................. 2018-141675

(51) Int. Cl.
*H04N 9/31* (2006.01)
*G03B 21/28* (2006.01)
*G03B 17/54* (2006.01)

(52) U.S. Cl.
CPC .......... *H04N 9/3176* (2013.01); *G03B 17/54* (2013.01); *G03B 21/28* (2013.01); *H04N 9/3194* (2013.01)

(58) Field of Classification Search
CPC .... G03B 17/54; G03B 21/28; G03B 21/2073; H04N 9/3141; G02B 27/286; G02B 27/283; G02B 27/144
See application file for complete search history.

(56) References Cited

U.S. PATENT DOCUMENTS

| 6,707,444 | B1 * | 3/2004 | Hendriks | G06F 3/03542 345/104 |
|---|---|---|---|---|
| 7,136,053 | B2 * | 11/2006 | Hendriks | G06F 3/03542 345/179 |
| 7,355,584 | B2 * | 4/2008 | Hendriks | G06F 3/03542 345/156 |
| 8,077,389 | B2 * | 12/2011 | Jabri | B82Y 20/00 252/585 |
| 8,526,108 | B2 * | 9/2013 | Weinold | G02B 27/0101 359/443 |
| 8,783,873 | B2 * | 7/2014 | Weinold | G02B 27/0101 353/20 |
| 9,405,405 | B2 * | 8/2016 | Shyu | G03B 21/26 |
| 10,048,476 | B2 * | 8/2018 | Amano | G02B 13/22 |
| 10,244,217 | B2 * | 3/2019 | Kaneda | H04N 9/317 |

(Continued)

FOREIGN PATENT DOCUMENTS

WO 2017/183249 A1 10/2017

*Primary Examiner* — Bao-Luan Q Le
(74) *Attorney, Agent, or Firm* — Studebaker & Brackett PC (57) ABSTRACT

A projection display device includes an imaging element, a light source, a light valve that modulates light from the light source and emits modulated light, and an imaging optical system. The imaging optical system includes a first optical system that is used in common in projection and imaging, a second optical system that is used only in projection, a third optical system that is used only in imaging, and a separation member that separates an optical path from the second optical system toward the first optical system from an optical path from the first optical system toward the third optical system. The third optical system includes a first light shielding member that is arranged in the vicinity of a stop position of the third optical system and shields a part of a luminous flux.

17 Claims, 10 Drawing Sheets

(56) References Cited

U.S. PATENT DOCUMENTS

| | | | |
|---|---|---|---|
| 10,372,269 B2* | 8/2019 | Miura | H04N 9/3197 |
| 10,602,108 B2* | 3/2020 | Kaneda | H04N 9/317 |
| 10,659,669 B2* | 5/2020 | Yasui | G02B 27/283 |
| 2003/0122780 A1* | 7/2003 | Hendriks | G06F 3/03542 |
| | | | 345/156 |
| 2005/0162409 A1* | 7/2005 | Hendriks | G06F 3/03542 |
| | | | 345/173 |
| 2007/0263174 A1* | 11/2007 | Shyu | G06F 3/0304 |
| | | | 353/34 |
| 2008/0051135 A1* | 2/2008 | Destain | G03B 21/20 |
| | | | 455/556.1 |
| 2009/0168172 A1* | 7/2009 | Jabri | B82Y 20/00 |
| | | | 359/487.06 |
| 2012/0081673 A1* | 4/2012 | Weinold | H04N 9/3155 |
| | | | 353/20 |
| 2012/0182610 A1* | 7/2012 | O'Hara | G02B 27/0101 |
| | | | 359/460 |
| 2012/0280941 A1* | 11/2012 | Hu | G03B 33/12 |
| | | | 345/175 |
| 2013/0107223 A1* | 5/2013 | Toyooka | G03B 21/2033 |
| | | | 353/31 |
| 2015/0138515 A1* | 5/2015 | Shyu | H04N 9/3197 |
| | | | 353/81 |
| 2016/0246037 A1* | 8/2016 | Amano | G02B 17/008 |
| 2017/0208305 A1* | 7/2017 | Kaneda | H04N 9/3167 |
| 2018/0321475 A1* | 11/2018 | Amano | G02B 13/22 |
| 2018/0321476 A1* | 11/2018 | Amano | G02B 13/06 |
| 2019/0132499 A1* | 5/2019 | Yasui | G03B 21/00 |
| 2019/0174105 A1* | 6/2019 | Kaneda | G03B 21/00 |

* cited by examiner

PROJECTION DISPLAY DEVICE FOR PROJECTING AND IMAGING

CROSS REFERENCE TO RELATED APPLICATIONS

The present application claims priority under 35 U.S.C. § 119 to Japanese Patent Application No. 2018-141675 filed on Jul. 27, 2018. The above application is hereby expressly incorporated by reference, in its entirety, into the present application.

BACKGROUND OF THE INVENTION

1. Field of the Invention

The present disclosure relates to a projection display device.

2. Description of the Related Art

In recent years, a projection display device that comprises a light valve, such as a liquid crystal display element or a digital micromirror device (DMD: Registered Trademark) display element, comprises an imaging element, such as a charge coupled device (CCD) or a complementary metal oxide semiconductor (CMOS), and can perform both of projection and imaging has been suggested (for example, WO2017/183249).

SUMMARY OF THE INVENTION

The projection display device of WO2017/183249 comprises a separation member that separates an optical path from a light valve toward a screen from an optical path from a magnification side (screen side) toward an imaging element, and is configured such that a part of an imaging optical system in the projection display device is used in common at the time of projection and at the time of imaging.

In the projection display device of WO2017/183249, since light from the common portion of the imaging optical system is directly incident on the imaging element at the time of imaging, an attempt to provide high imaging quality causes an inevitable increase in the number of lenses of the common portion.

However, since light from the light valve is incident on the common portion of the imaging optical system, in a case where the number of lenses of the common portion increases, the number of reflective surfaces of light increases, and stray light incident on the imaging element increases, causing deterioration of imaging quality, such as occurrence of ghost in a captured image.

The present disclosure has been accomplished in consideration of the above-described situation, and an object of the present disclosure is to provide a projection display device capable of performing both of projection and imaging, and suppressing deterioration of imaging quality.

Specific means for solving the above-described problem include the following aspects.

<1> A projection display device comprising an imaging element that images received light, a light source, a light valve that modulates light from the light source and emits modulated light, and an imaging optical system that projects an optical image of the light modulated by the light valve onto a magnification side imaging surface and forms an image of light incident from a magnification side on the imaging element, in which the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system, and the third optical system comprises a first light shielding member that is arranged in the vicinity of a stop position of the third optical system and shields a part of a luminous flux.

<2> The projection display device of <1>, in which the first light shielding member shields a region including an optical axis.

<3> The projection display device of <1> or <2>, in which the imaging element is arranged at a position where light that is emitted from the light source and is incident on the light valve is not directly incident.

<4> The projection display device of any one of <1> to <3>, in which, in a case where an area of a light shielding region of the first light shielding member is S1, and an aperture area of a stop of the third optical system is S, a conditional expression (1) is satisfied.

$$0.3 < S1/S < 0.9 \tag{1}$$

<5> The projection display device of any one of <1> to <4>, in which, in a case where a stop diameter of an optical system consisting of the first optical system and the third optical system to be used in imaging is AD, the vicinity of the stop position of the third optical system is within a range of ±0.8 AD around the stop position of the third optical system on the optical axis.

<6> The projection display device of any one of <1> to <5>, in which, in a case where a distance on an optical axis from a surface of the first optical system on a most magnification side to the separation member is L1, and a distance on the optical axis from the surface of the first optical system on the most magnification side to a surface of the second optical system on a most reduction side is L, a conditional expression (2) is satisfied.

$$0 < L1/L < 0.7 \tag{2}$$

<7> The projection display device of any one of <1> to <6>, further comprising a second light shielding member that is arranged in the vicinity of a stop position of the second optical system and shields a part of a luminous flux.

<8> The projection display device of <7>, in which the second light shielding member shields a peripheral region in a stop of the second optical system.

<9> The projection display device of any one of <1> to <8>, in which the third optical system comprises a third light shielding member that is provided separately from the first light shielding member and shields a part of a luminous flux.

<10> The projection display device of any one of <1> to <9>, further comprising the second optical system comprises a fourth light shielding member that shields a part of a luminous flux.

<11> The projection display device of any one of <1> to <10>, in which the first optical system comprises a plurality of negative lenses in a successive manner in order from the magnification side along an optical path, and comprises a fifth light shielding member that is arranged between the plurality of negative lenses and shields a part of a luminous flux.

<12> The projection display device of any one of <1> to <11>, in which a light shielding rate of a light shielding region of a light shielding member in the imaging optical system has a distribution corresponding to a pupil intensity distribution.

<13> The projection display device of any one of <1> to <12>, in which an optical system consisting of the first optical system and the second optical system to be used in projection is a relay optical system that forms an intermediate image.

<14> The projection display device of <13>, further comprising a sixth light shielding member that is arranged at a position of the intermediate image on an optical path or a position adjacent to the intermediate image on the optical path and shields a part of a luminous flux.

<15> The projection display device of <13>, further comprising a sixth light shielding member that is arranged to be closer to the magnification side than the intermediate image on an optical path and shields a part of a luminous flux.

<16> The projection display device of any one of <13> to <15>, in which the separation member is arranged to be closer to the magnification side than the intermediate image on an optical path.

<17> The projection display device of <4>, in which conditional expression (1-1) is satisfied.

$$0.4 < S1/S < 0.9 \tag{1-1}$$

In the present disclosure, the "stop position" means a position where an F-Number of an optical system is decided (a position where a center luminous flux diameter is decided).

According to the present disclosure, it is possible to provide a projection display device capable of suppressing deterioration of imaging quality.

DESCRIPTION OF THE PREFERRED EMBODIMENTS

Figure 1:
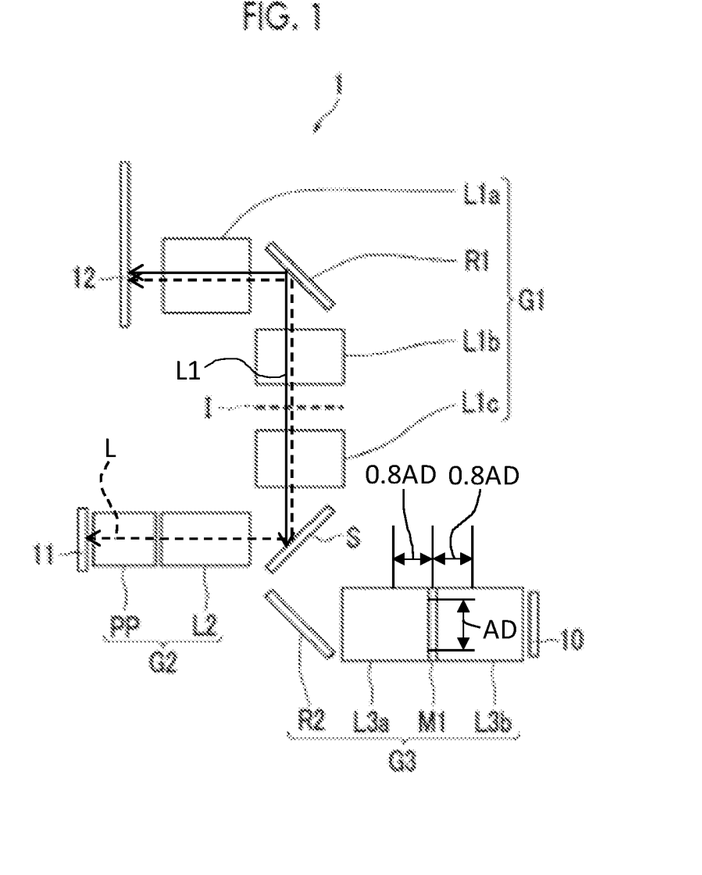
FIG. 1 is a schematic configuration diagram of a projection display device according to a first embodiment of the invention.

Hereinafter, a first embodiment of a projection display device of the invention will be described in detail referring to the drawings. FIG. 1 is a schematic configuration diagram of a projection display device according to the first embodiment of the invention. In FIG. 1, a screen 12 side becomes a magnification side in an optical path order.

As shown in FIG. 1, a projection display device 1 of the embodiment comprises an imaging element 10 that images received light, an image projection unit 11 that consists of a light source and a light valve, and an imaging optical system that projects an optical image of light modulated by the light valve onto a screen (magnification side imaging surface) 12 and forms an image of light incident from the magnification side on the imaging element.

The light valve modulates light from the light source and emits modulated light. As an image display element that is used for the light valve, any image display element, such as a liquid crystal display element or a digital micromirror device (DMD: Registered Trademark) display element, may be used. The light source may be appropriately composed corresponding to a system of the image display element of the light valve.

The imaging optical system comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises, in order from the magnification side on an optical path, a lens group L1a, a reflection member R1, a lens group L1b, and a lens group L1c.

The second optical system G2 comprises, in order from the magnification side on an optical path, a lens group L2, and an optical member PP assumed to be a filter, a prism, or the like that is used in a color synthesis unit or an illumination light separation unit.

The third optical system G3 comprises, in order from the magnification side on an optical path, a reflection member R2, a lens group L3a, a mask (first light shielding member) M1 that is arranged in the vicinity of a stop position of the third optical system G3 and shields a part of a luminous flux, and a lens group L3b. Here, "the vicinity of the stop position of the third optical system G3" means a space between a lens adjacent to the magnification side of the stop position on the optical path and a lens adjacent to a reduction side. Since the mask M1 also has a function as a stop, the third optical system G3 does not need to comprise a separate stop. However, the invention is not limited to such an aspect, and the third optical system G3 may comprise a mask and a stop individually.

Each lens group in the first optical system G1, the second optical system G2, and the third optical system G3 is not limited to a configuration in which the lens group consists of a plurality of lenses, and may have a configuration in which the lens group consists of only one lens.

The separation member S reflects light from the second optical system G2 toward the first optical system G1 and transmits light from the first optical system G1 toward the third optical system G3, and is composed of, for example, a transflective member, such as a half mirror.

The imaging optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress ghost.

The mask M1 is provided in the vicinity of the stop position of the third optical system G3, whereby it is possible to suppress ghost without affecting projection.

Figure 2:
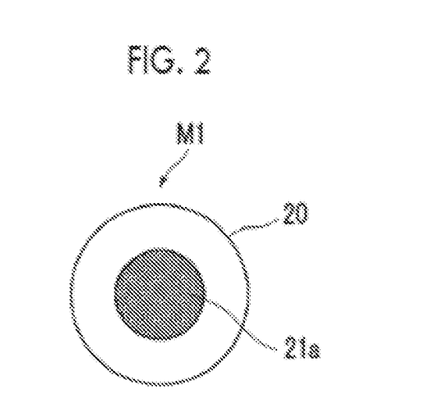
FIG. 2 is a schematic configuration diagram of a light shielding member that is arranged in a third optical system of the projection display device.

An operation will be described specifically. As an example, a case where the mask M1 shown in FIG. 2 is used will be described. In the mask M1, a circular light shielding region 21a including an optical axis is formed around the optical axis in a center portion of an aperture region 20.

A pupil intensity distribution of the light source becomes high near the optical axis. Furthermore, ghost with strong strength has a characteristic to be likely to have imageability. Since ghost having imageability maintains a relationship close to a conjugate relationship even in reflection, even in a case where ghost is incident on the imaging element 10, ghost is reflected in the same optical path as at the time of projection. In this case, since the relationship of the pupil intensity distribution is maintained even at the stop position of the third optical system G3, a center portion is shielded by the mask M1 arranged in the vicinity of the stop position, whereby it is possible to transmit imaging light through a peripheral portion while increasing a reduction effect of ghost.

Figure 3:
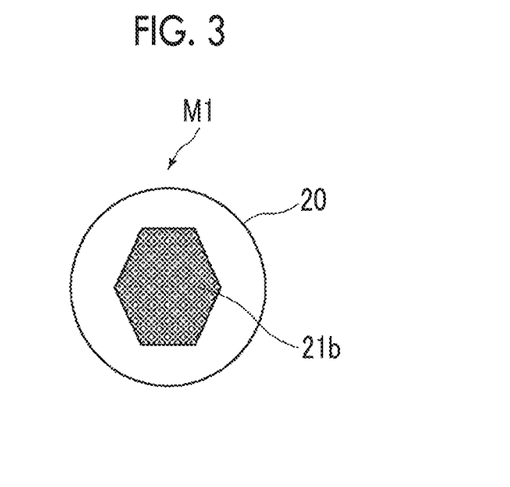
FIG. 3 is a schematic configuration diagram of a light shielding member that is arranged in the third optical system of the projection display device.

The shape of the light shielding region of the mask M1 is not limited to the aspect of FIG. 2, and as shown in FIG. 3, a polygonal light shielding region 21b may be formed in the center portion of the aperture region 20. For example, there is a case where a fly eye is used in at least a part of the lenses (the lenses of the first optical system G1 and the second optical system G2) to be used in projection. The fly eye has lenses arranged in lattice. Accordingly, the relationship of the pupil intensity distribution is maintained to the stop position, the intensity distribution is distributed in lattice. In this way, in a configuration in which the pupil intensity distribution changes in a noncircular shape, the polygonal light shielding region 21b is formed corresponding to the shape of the pupil intensity distribution, whereby it is possible to efficiently shield a region of ghost with strong strength while leaving a transmissive region of imaging light in the peripheral portion.

Figure 4:
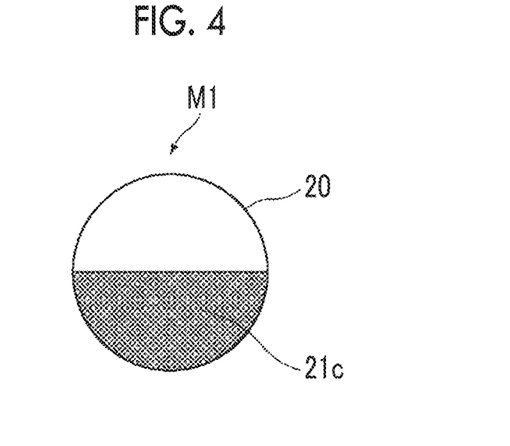
FIG. 4 is a schematic configuration diagram of a light shielding member that is arranged in the third optical system of the projection display device.

As shown in FIG. 4, a light shielding region 21c that is a half region of the aperture region 20 may be formed. With such a configuration, since it is possible to equalize the light shielding rate of the luminous flux between the center and the periphery, it is possible to reduce ghost while suppressing change in peripheral light amount ratio.

Figure 5:
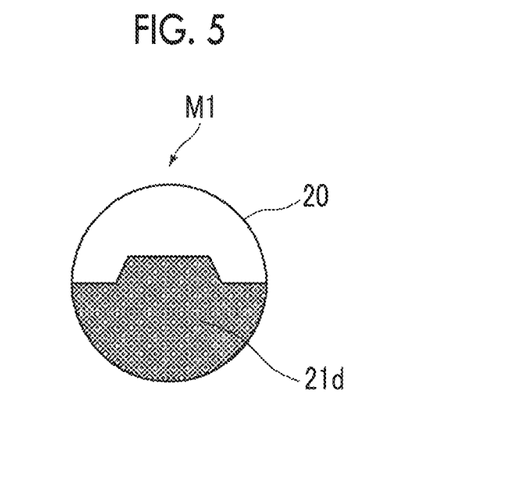
FIG. 5 is a schematic configuration diagram of a light shielding member that is arranged in the third optical system of the projection display device.

As shown in FIG. 5, a light shielding region 21d having a combined shape of the half region of the aperture region 20 and the region of the center portion may be formed. With such a configuration, it is possible to efficiently shield the region of ghost with strong strength while suppressing change in peripheral light amount ratio. In FIG. 5, although the region of the center portion is formed in a polygonal shape as an example, the region of the center portion may be formed in a circular shape corresponding to the shape of the pupil intensity distribution.

The light shielding rate of the light shielding region of the light shielding member in the imaging optical system is not limited to 100%, and may be less than 100%.

Figure 6:
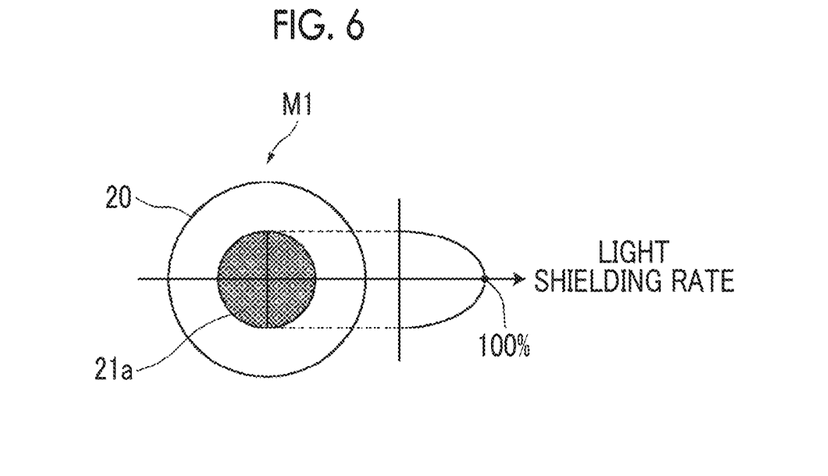
FIG. 6 is a diagram showing a light shielding rate distribution of a light shielding region of the light shielding member shown in FIG. 2.

The light shielding rate of the light shielding region of the light shielding member in the imaging optical system may have a distribution corresponding to the pupil intensity distribution. Here, as an example, a case where the mask M1 formed with the circular light shielding region 21a is used will be described. As shown in FIG. 6, the light shielding rate at the center of the light shielding region 21a is 100%, and the light shielding rate decreases toward the periphery of the light shielding region 21a. With such a configuration, it is possible to suppress decrease in the amount of imaging light while shielding the region of ghost with strong strength near the center.

In the projection display device 1 of the embodiment, it is preferable that the imaging element 10 is arranged at a position where light that is emitted from the light source and is incident on the light valve is not directly incident. With such a configuration, even in a case where light of an intense light amount before being incident on the light valve is transmitted through the separation member S, the lens, or the like in a form different from a design intention, since it is possible to restrain light from being incident on the imaging element 10, it is possible to suppress deterioration of imaging quality.

It is preferable that, in a case where an area of the light shielding region of the mask (first light shielding member) M1 is S1, and an aperture area of a stop of the third optical system G3 is S, a conditional expression (1) is satisfied. The result of the conditional expression (1) is restrained from being equal to or less than a lower limit, whereby it is possible to secure a light shielding region needed for shielding ghost light. The result of the conditional expression (1) is restrained from being equal to or greater than an upper limit, whereby it is possible to suppress a decrease in the amount of imaging light transmitted through the mask M1. That is, the conditional expression (1) is satisfied, whereby it is possible to transmit imaging light of a sufficient light amount in the mask M1 while increasing a reduction effect of ghost. In a case where the conditional expression (1-1) is satisfied, it is possible to obtain more favorable characteristics.

$$0.3 < S1/S < 0.9 \tag{1}$$

$$0.4 < S1/S < 0.9 \tag{1-1}$$

It is preferable that, in a case where a stop diameter of an optical system consisting of the first optical system G1 and the third optical system G3 to be used in imaging is AD, the vicinity of the stop position of the third optical system G3 is within a range of ±0.8 AD around the stop position of the third optical system G3 on the optical axis. With such a configuration, it is possible to reduce ghost without affecting projection.

It is preferable that, in a case where a distance on the optical axis from a surface of the first optical system G1 on a most magnification side to the separation member S is L1, and a distance on the optical axis from the surface of the first optical system G1 on the most magnification side to a surface of the second optical system G2 on a most reduction side is L, a conditional expression (2) is satisfied. The result of the conditional expression (2) is restrained from being equal to or greater than an upper limit, whereby it is possible to suppress an increase in the number of lenses (the lenses of the first optical system G1) to be used in projection among the lenses (the lenses of the first optical system G1 and the third optical system G3) to be used in imaging, and the number of reflective surfaces of projection light decreases. For this reason, it is possible to suppress ghost.

$$0 < L1/L < 0.7 \qquad (2)$$

Figure 7:
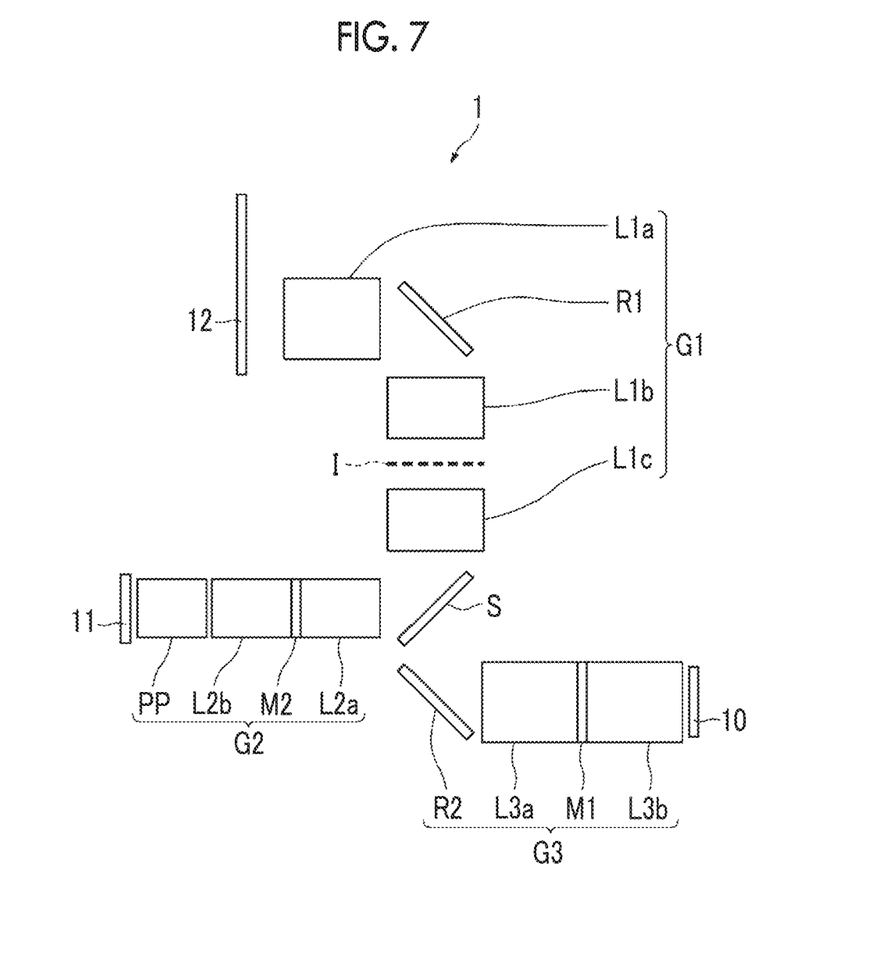
FIG. 7 is a schematic configuration diagram of a modification example of a projection display device according to the first embodiment of the invention.

As shown in FIG. 7, a mask (second light shielding member) M2 that is arranged in the vicinity of the stop position of the second optical system G2 and shields a part of a luminous flux may be provided. Here, "the vicinity of the stop position of the second optical system G2" means a space between a lens adjacent to the magnification side of the stop position on the optical path and a lens adjacent to the reduction side. With such a configuration, it is possible to reduce ghost without affecting imaging.

Figure 8:
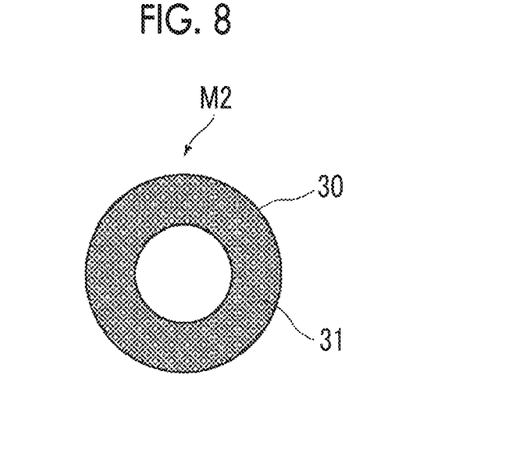
FIG. 8 is a schematic configuration diagram of a light shielding member that is arranged in a second optical system of the projection display device.

In this case, it is preferable that the mask M2 shields a peripheral region in a stop of the second optical system G2. As an example, a case where the mask M2 shown in FIG. 8 is used will be described. In the mask M2, a light shielding region 31 is formed in a peripheral region excluding a circular center region of an aperture region 30. Since the pupil intensity distribution of the light source is likely to become high near the optical axis, with such a configuration, it is possible to reduce ghost while securing an amount of projection light by shielding the periphery.

Figure 9:
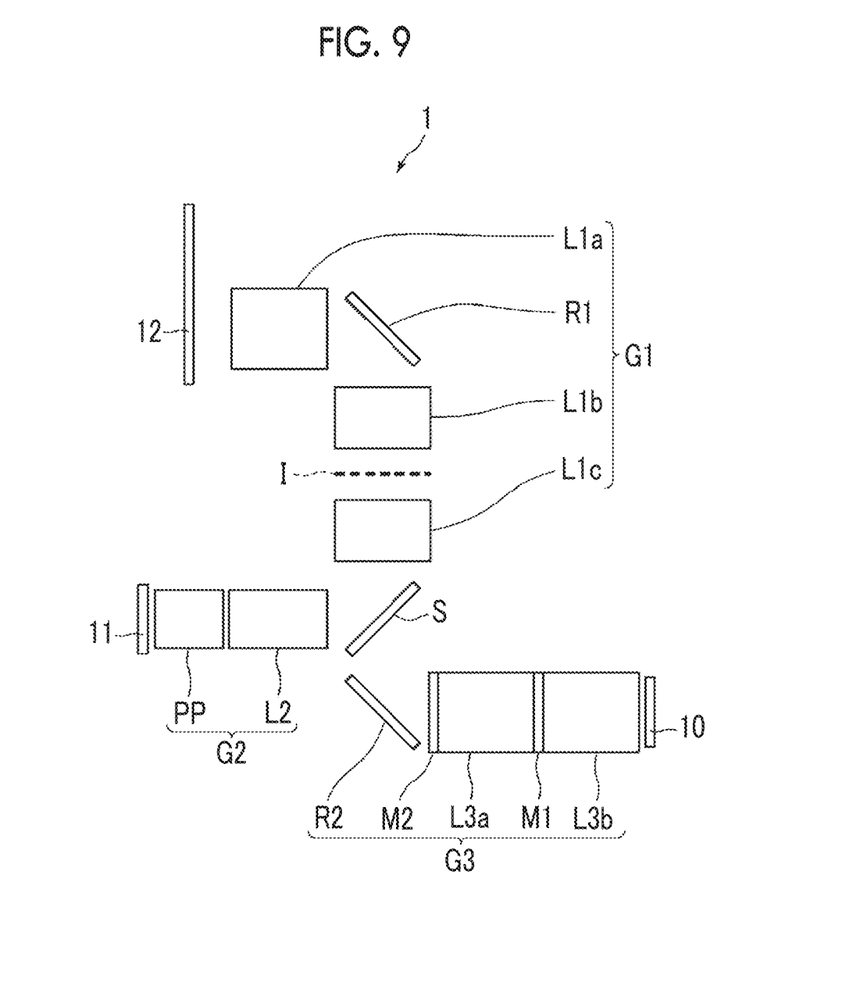
FIG. 9 is a schematic configuration diagram of a modification example of a projection display device according to the first embodiment of the invention.

As shown in FIG. 9, the third optical system G3 may comprise a mask (third light shielding member) M2 that is provided separately from the mask M1 and shields a part of a luminous flux. With such a configuration, it is possible to further reduce ghost without affecting projection.

Figure 10:
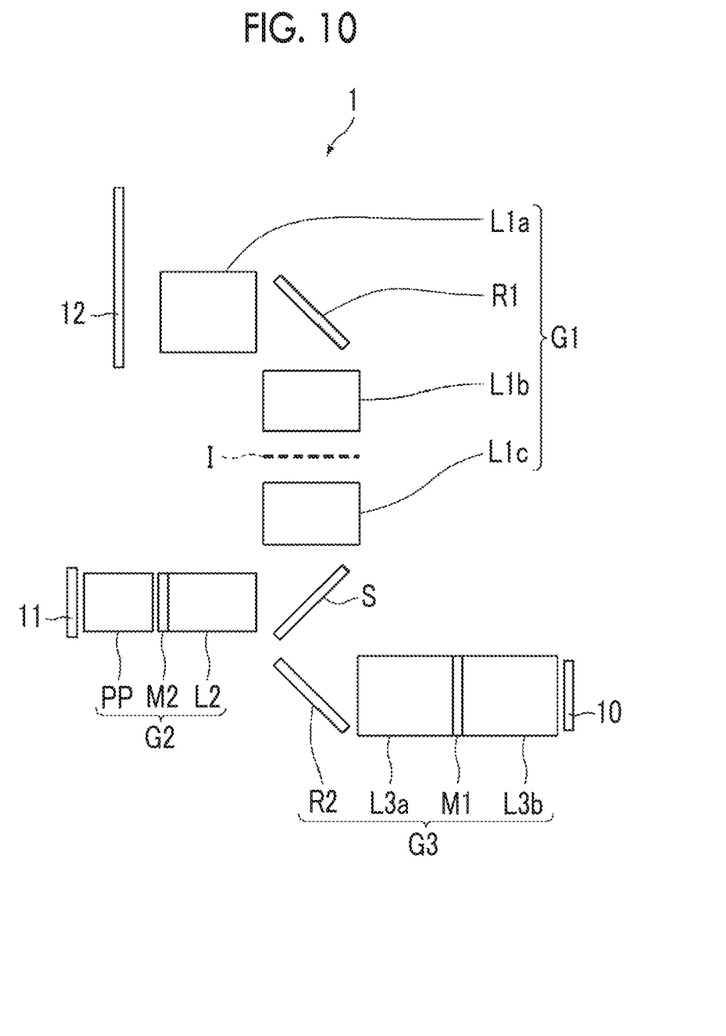
FIG. 10 is a schematic configuration diagram of a modification example of a projection display device according to the first embodiment of the invention.
Figure 11:
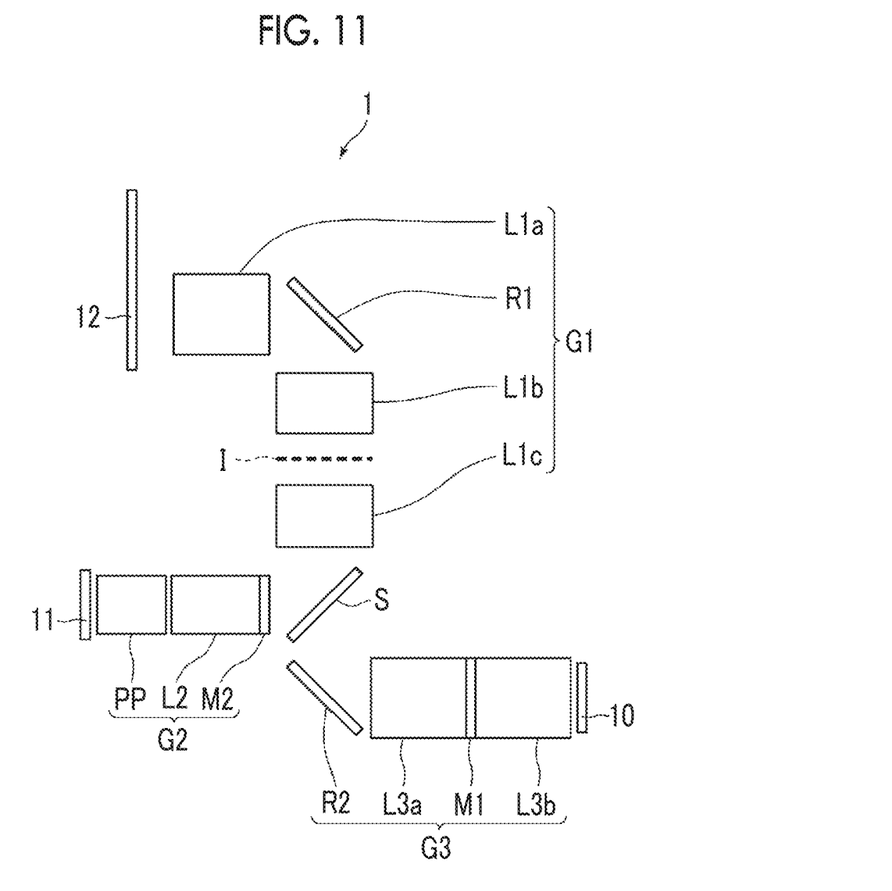
FIG. 11 is a schematic configuration diagram of a modification example of a projection display device according to the first embodiment of the invention.

As shown in FIG. 10, the second optical system G2 may comprise a mask (fourth light shielding member) M2 that shields a part of a luminous flux. With such a configuration, it is possible to further reduce ghost without affecting imaging. An arrangement position of the mask M2 is not limited to the reduction side of the lens group L2, and as shown in FIG. 11, the mask M2 may be arranged on the magnification side of the lens group L2.

Figure 12:
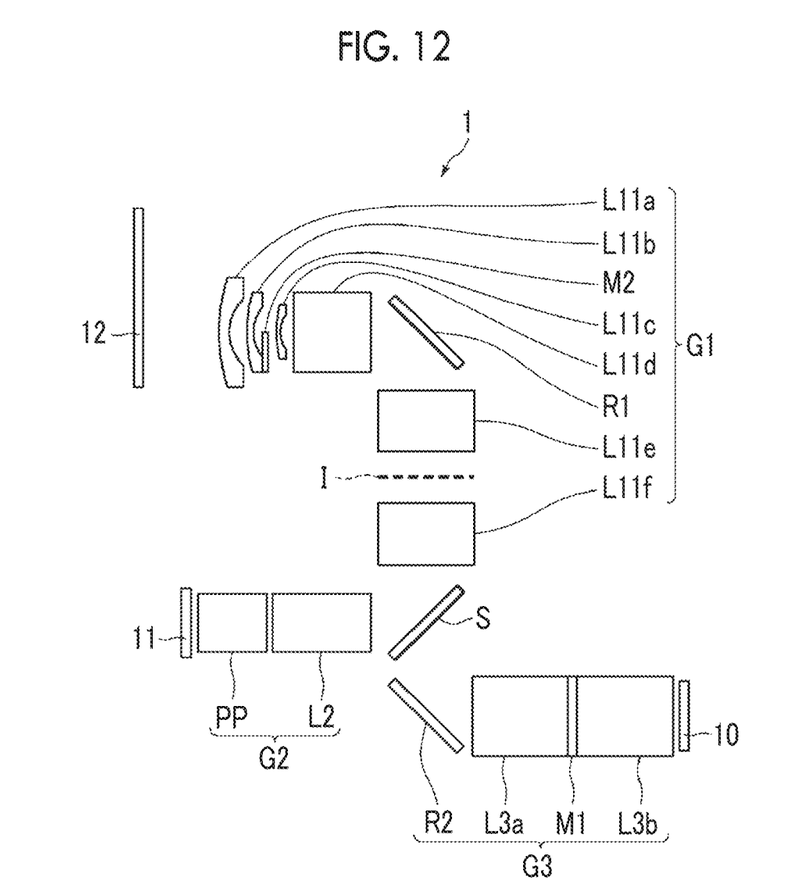
FIG. 12 is a schematic configuration diagram of a modification example of a projection display device according to the first embodiment of the invention.

As shown in FIG. 12, the first optical system G1 may comprise a plurality of negative lenses in a successive manner in order from the magnification side along the optical path, and may comprise a mask (fifth light shielding member) M2 that is provided between a plurality of negative lenses and shields a part of a luminous flux. In FIG. 12, as an example, the first optical system G1 comprising, in order from the magnification side on the optical path, a negative lens L11$a$, a negative lens L11$b$, the mask M2, a negative lens L11$c$, a lens group L11$d$, a reflection member R1, a lens group L11$e$, and a lens group L11$f$ is shown.

In general, a lens near the most magnification side of the imaging optical system of the projection display device has many lens surfaces where a curvature is large and ghost is likely to occur. For this reason, the mask M2 is provided between a plurality of successive negative lenses, whereby it is possible to obtain a high ghost reduction effect.

Among the projection display devices, there is a projection display device in which projection light is transmitted only through about a half region within an effective diameter of a lens near the most magnification side of the imaging optical system. For this reason, in such a projection display device, the light shielding region of the mask M2 is set in a region through which projection light is not transmitted, whereby it is possible to reduce ghost without decreasing the amount of projection light.

It is preferable that an optical system consisting of the first optical system G1 and the second optical system G2 to be used in projection is a relay optical system that forms an intermediate image I. With such a configuration, it is possible to achieve a wide angle with one eye. Furthermore, an optical system to be used in projection is composed of a relay optical system, whereby a reflection member that bends the optical path is easily inserted into the optical system, and a light beam on the projection display device side in projection light emitted from the projection display device can approach a horizontal state to a housing of the projection display device. For this reason, it is possible to improve the installability of the projection display device.

Figure 13:
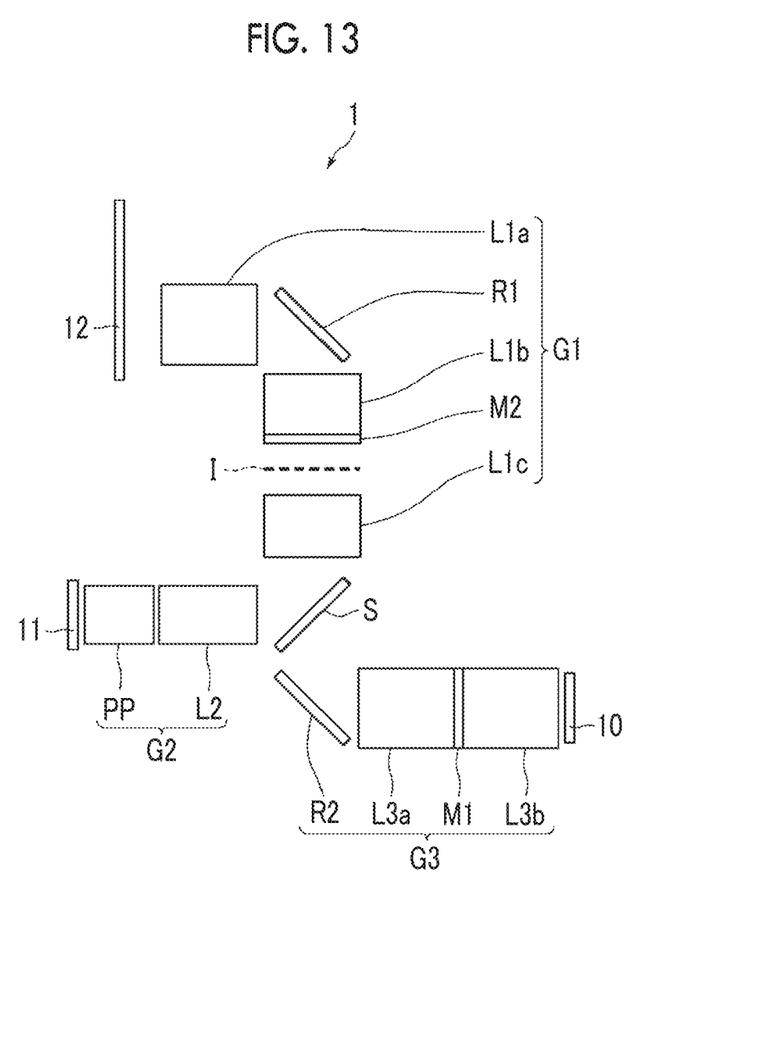
FIG. 13 is a schematic configuration diagram of a modification example of a projection display device according to the first embodiment of the invention.

In a case where an optical system to be used in projection is a relay optical system, as shown in FIG. 13, a mask (sixth light shielding member) M2 that is arranged at a position of the intermediate image I on the optical path or a position adjacent to the intermediate image I on the optical path and shields a part of a luminous flux may be provided. With such a configuration, it is possible to separate ghost from projection light and to shield ghost like a field stop.

Similarly, in a case where an optical system to be used in projection is a relay optical system, as shown in FIG. 13, a mask (sixth light shielding member) M2 that is arranged to be closer to the magnification side than the intermediate image I on the optical path and shields a part of a luminous flux may be provided. With such a configuration, it is possible to reduce ghost from the first optical system G1 to be used in common in projection and imaging.

Figure 14:
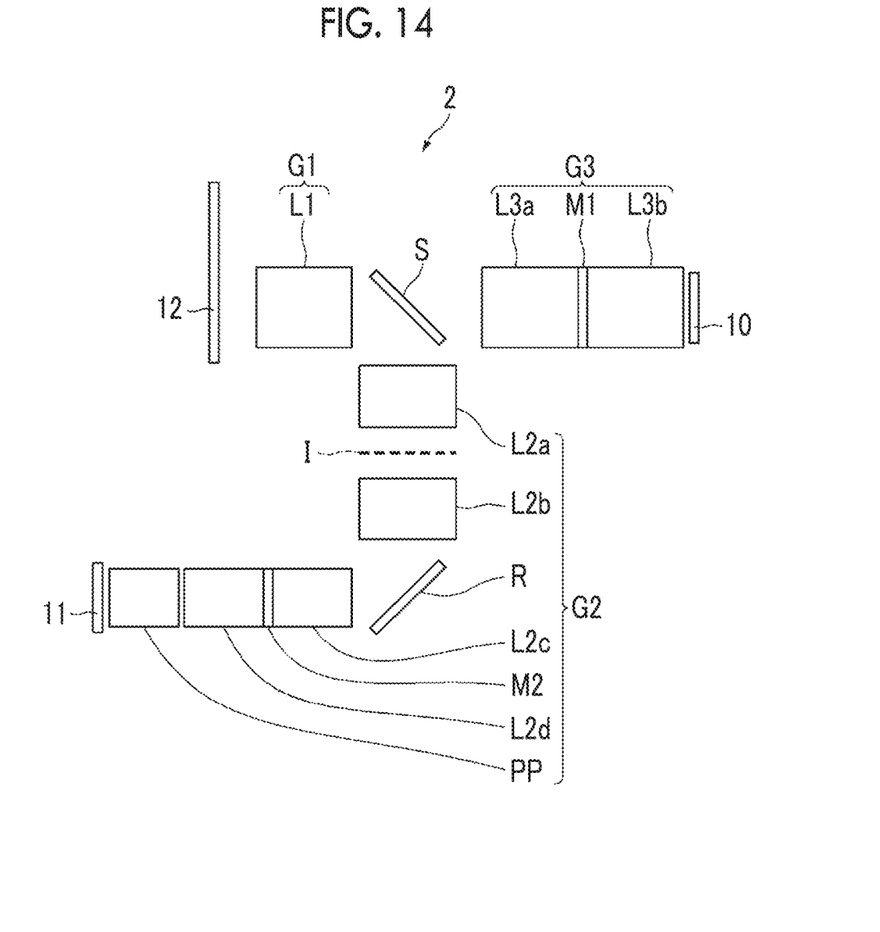
FIG. 14 is a schematic configuration diagram of a projection display device according to a second embodiment of the invention.

Next, a second embodiment of a projection display device of the invention will be described in detail referring to the drawings. FIG. 14 is a schematic configuration diagram of a projection display device according to the second embodiment of the invention. In FIG. 14, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 2 of the embodiment has the configuration of the imaging optical system different from the projection display device 1 of the first embodiment. As shown in FIG. 14, the imaging optical system of the projection display device 2 of the embodiment comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises a lens group L1.

The second optical system G2 comprises, in order from the magnification side on the optical path, a lens group L2a, a lens group L2b, a reflection member R, a lens group L2c, a mask (second light shielding member) M2 that is arranged in the vicinity of the stop position of the second optical system G2 and shields a part of a luminous flux, a lens group L2d, and an optical member PP assumed to a filter, a prism, or the like that is used in a color synthesis unit or an illumination light separation unit.

The third optical system G3 comprises, in order from the magnification side on the optical path, a lens group L3a, a mask (first light shielding member) M1 that is arranged in the vicinity of the stop position of the third optical system G3 and shields a part of a luminous flux, and a lens group L3b.

The separation member S reflects light from the second optical system G2 toward the first optical system G1 and transmits light from the first optical system G1 toward the third optical system G3, and is composed of, for example, a transflective member, such as a half mirror.

Even in the projection display device 2 of the embodiment, it is possible to obtain the same effects as the projection display device 1 of the first embodiment.

In the imaging optical system of the projection display device 2 of the embodiment, an optical system consisting of the first optical system G1 and the second optical system G2 to be used in projection is a relay optical system. In this case, it is preferable that the separation member S is arranged to be closer to the magnification side than the intermediate image I on the optical path. With such a configuration, the number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

Figure 15:
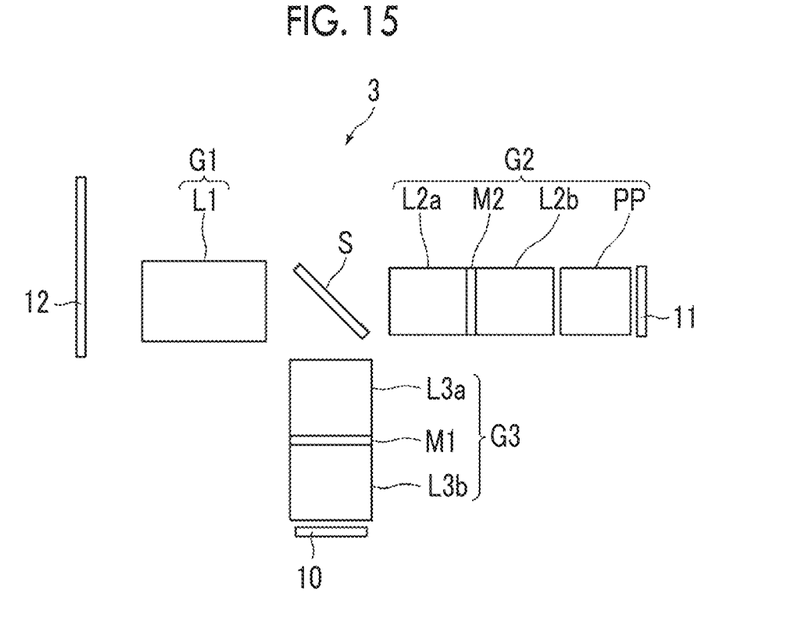
FIG. 15 is a schematic configuration diagram of a projection display device according to a third embodiment of the invention.

Next, a third embodiment of a projection display device of the invention will be described in detail referring to the drawings. FIG. 15 is a schematic configuration diagram of a projection display device according to the third embodiment of the invention. In FIG. 15, the screen 12 side becomes the magnification side in the optical path order. In the embodiment, elements similar to the elements in FIG. 1 are represented by the same reference numerals and description thereof will not be repeated unless needed. Here, only a difference will be primarily described.

As shown in FIG. 15, while a projection display device 3 of the embodiment has the configuration of a second optical system G2 slightly different from the projection display device 2 of the second embodiment, the positions of the second optical system G2 and the third optical system G3 with respect to the separation member S are changed.

The second optical system G2 of the embodiment comprises, in order from the magnification side on the optical path, a lens group L2a, a mask (second light shielding member) M2 that is arranged in the vicinity of the stop position of the second optical system G2 and shields a part of a luminous flux, a lens group L2b, and an optical member PP assumed to be a filter, a prism, or the like that is used in a color synthesis unit or an illumination light separation unit.

The separation member S transmits light from the second optical system G2 toward the first optical system G1 and reflects light from the first optical system G1 toward the third optical system G3.

Even in the projection display device 3 of the embodiment, it is possible to obtain the same effects as the projection display device 1 of the first embodiment.

Although embodiments of the projection display device of the invention have been described above, the invention is not limited to the embodiments.

For example, in the imaging optical system, in a case where an optical system consisting of the first optical system and the second optical system to be used in projection is a relay optical system, the separation member may be arranged at the position of the intermediate image on the optical path or the position adjacent to the intermediate image on the optical path. Since a space is easily secured near the intermediate image, with such a configuration, the separation member is easily arranged.

As described above, in a case where the separation member is arranged near the intermediate image, an optical system to be closer to the magnification side than the intermediate image becomes the first optical system. In a case where a relay optical system is made to have high performance, since many lenses are needed to be closer to the magnification side than the intermediate image, the number of lenses of the first optical system G1 to be used in common in projection and imaging increases. As a result, since it is possible to suppress the number of lenses of the second optical system to be used only in projection and the third optical system to be used only in imaging, it is possible to achieve reduction in size of the entire imaging optical system.

A wavelength range of projection light may not be the same as a detection wavelength range of the imaging element, and the ranges may partially overlap each other. For example, projection light may be visible light, and the detection wavelength range of the imaging element may be visible light and infrared light.

In addition to those described above, various improvements or modifications may be of course made without departing from the spirit and scope of the invention.

EXPLANATION OF REFERENCES 1 to 3: projection display device
10: imaging element
11: image projection unit
12: screen
20, 30: aperture region
21a to 21d, 31: light shielding region
G1: first optical system
G2: second optical system
G3: third optical system
I: intermediate image
M1, M2: mask
L1 to L11f: lens group
PP: optical member
R, R1, R2: reflection member
S: separation member

What is claimed is:
1. A projection display device comprising:
an imaging element that images received light;
a light source;
a light valve that modulates light from the light source and emits modulated light; and an imaging optical system that projects an optical image of the light modulated by the light valve onto a magnification side imaging surface and forms an image of light incident from a magnification side on the imaging element, wherein the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system, and the third optical system comprises a first light shielding member that is arranged in a vicinity of a stop position of the third optical system and shields a part of a luminous flux, wherein, in a case where a stop diameter of an optical system consisting of the first optical system and the third optical system to be used in imaging is AD, the vicinity of the stop position of the third optical system is within a range of ±0.8 AD around the stop position of the third optical system on the optical axis.

2. The projection display device according to claim 1, wherein the first light shielding member shields a region including an optical axis.

3. The projection display device according to claim 1, wherein the imaging element is disposed at a position where light that is emitted from the light source and is incident on the light valve is not directly incident.

4. The projection display device according to claim 1, wherein, in a case where an area of a light shielding region of the first light shielding member is Si, and an aperture area of a stop of the third optical system is S, a conditional expression (1) is satisfied $$0.3 < S1/S < 0.9 \qquad (1).$$

5. The projection display device according to claim 1, wherein, in a case where a distance on an optical axis from a surface of the first optical system on a most magnification side to the separation member is L1, and a distance on the optical axis from the surface of the first optical system on the most magnification side to a surface of the second optical system on a most reduction side is L, a conditional expression (2) is satisfied, $$0 < L1/L < 0.7 \qquad (2).$$

6. The projection display device according to claim 1, further comprising:
a second light shielding member that is arranged in the vicinity of a stop position of the second optical system and shields a part of a luminous flux.

7. The projection display device according to claim 6, wherein the second light shielding member shields a peripheral region in a stop of the second optical system.

8. The projection display device according to claim 1, wherein the third optical system comprises a third light shielding member that is provided separately from the first light shielding member and shields a part of a luminous flux.

9. The projection display device according to claim 1, wherein the second optical system comprises a fourth light shielding member that shields a part of a luminous flux.

10. The projection display device according to claim 1, wherein the first optical system comprises a plurality of negative lenses in a successive manner in order from the magnification side along an optical path, and comprises a fifth light shielding member that is arranged between the plurality of negative lenses and shields a part of a luminous flux.

11. The projection display device according to claim 1, wherein a light shielding rate of a light shielding region of a light shielding member in the imaging optical system has a distribution corresponding to a pupil intensity distribution.

12. The projection display device according to claim 1, wherein an optical system consisting of the first optical system and the second optical system to be used in projection is a relay optical system that forms an intermediate image.

13. The projection display device according to claim 12, further comprising:
a sixth light shielding member that is arranged at a position of the intermediate image on an optical path or a position adjacent to the intermediate image on the optical path and shields a part of a luminous flux.

14. The projection display device according to claim 12, further comprising:
a sixth light shielding member that is arranged to be closer to the magnification side than the intermediate image on an optical path and shields a part of a luminous flux.

15. The projection display device according to claim 12, wherein the separation member is arranged to be closer to the magnification side than the intermediate image on an optical path.

16. The projection display device according to claim 12, wherein a conditional expression (1-1) is satisfied, $$0.4 < S1/S < 0.9 \qquad (1\text{-}1).$$

17. A projection display device comprising:
an imaging element that images received light;
a light source;
a light valve that modulates light from the light source and emits modulated light; and
an imaging optical system that projects an optical image of the light modulated by the light valve onto a magnification side imaging surface and forms an image of light incident from a magnification side on the imaging element, wherein the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system, and the third optical system comprises a first light shielding member that is arranged in a vicinity of a stop position of the third optical system and shields a part of a luminous flux, wherein, in a case where a distance on an optical axis from a surface of the first optical system on a most magnification side to the separation member is L1, and a distance on the optical axis from the surface of the first optical system on the most magnification side to a surface of the second optical system on a most reduction side is L, a conditional expression (2) is satisfied, $$0 < L1/L < 0.7 \qquad (2).$$

* * * * *